(12) United States Patent
Maehara (10) Patent No.: US 11,279,398 B2
(45) Date of Patent: Mar. 22, 2022

(54) MAGNETIC DETECTION DEVICE, TORQUE SENSOR AND ELECTRIC POWER STEERING DEVICE

(71) Applicant: KYB Corporation, Tokyo (JP)

(72) Inventor: Hideo Maehara, Gifu (JP)

(73) Assignee: KYB Corporation, Tokyo (JP)

( * ) Notice: Subject to any disclaimer, the term of this patent is extended or adjusted under 35 U.S.C. 154(b) by 270 days.

(21) Appl. No.: 16/492,153

(22) PCT Filed: Apr. 3, 2018

(86) PCT No.: PCT/JP2018/014209
§ 371 (c)(1),
(2) Date: Sep. 9, 2019

(87) PCT Pub. No.: WO2018/190185
PCT Pub. Date: Oct. 18, 2018

(65) Prior Publication Data
US 2020/0047790 A1 Feb. 13, 2020

(30) Foreign Application Priority Data

Apr. 11, 2017 (JP) .............................. JP2017-078122

(51) Int. Cl.
*B62D 5/00* (2006.01)
*B62D 5/04* (2006.01)
*G01L 5/22* (2006.01)
*G01L 3/10* (2006.01)

(52) U.S. Cl.
CPC ........... *B62D 5/005* (2013.01); *B62D 5/0463* (2013.01); *G01L 5/221* (2013.01); *G01L 3/10* (2013.01)

(58) Field of Classification Search
CPC ....... B62D 5/005; B62D 5/0463; G01L 5/221; G01L 3/10
See application file for complete search history.

(56) References Cited

U.S. PATENT DOCUMENTS

2004/0231644 A1\* 11/2004 Ikeda .................... F02D 9/1065
123/399
2012/0073897 A1 3/2012 Ohnishi et al.
(Continued)

FOREIGN PATENT DOCUMENTS

| CN | 1727859 A | * | 2/2006 |
| JP | S50-120374 U | | 10/1975 |
| JP | 2006119087 A | * | 5/2006 |

(Continued)

OTHER PUBLICATIONS

International Search Report and Written Opinion in PCT/JP2018/014209, dated May 22, 2018. 10pp.

*Primary Examiner* — Jacob D Knutson
(74) *Attorney, Agent, or Firm* — Hauptman Ham, LLP (57) ABSTRACT

A magnetic detection device includes a substrate including a penetration part, a magnetic detection part supported on the substrate to overlap the penetration part, a pair of magnetic guiding parts arranged to sandwich the penetration part and the magnetic detection part, the pair of magnetic guiding parts being configured to guide a magnetic flux from a magnetic generation part to the magnetic detection part, and a soft magnetic member at least partially provided inside the penetration part.

12 Claims, 7 Drawing Sheets

(56) References Cited

U.S. PATENT DOCUMENTS

| | | | |
|---|---|---|---|
| 2016/0153849 A1* | 6/2016 | Takahashi | B62D 6/10 73/862.325 |
| 2016/0153850 A1* | 6/2016 | Takahashi | G01R 33/07 73/862.325 |

FOREIGN PATENT DOCUMENTS

| | | | |
|---|---|---|---|
| JP | 2012-66694 A | | 4/2012 |
| JP | 2016-102671 A | | 6/2016 |
| JP | 2016-102672 A | | 6/2016 |
| JP | 2018017597 A | * | 2/2018 |

* cited by examiner

MAGNETIC DETECTION DEVICE, TORQUE SENSOR AND ELECTRIC POWER STEERING DEVICE

RELATED APPLICATIONS

The present application is National Phase of International Application Number PCT/JP2018/014209, filed Apr. 3, 2018, and claims priority based on Japanese Patent Application No. 2017-078122, filed Apr. 11, 2017.

TECHNICAL FIELD

The present invention relates to a magnetic detection device, a torque sensor with the magnetic detection device and an electric power steering device with the torque sensor.

BACKGROUND ART

JP2016-102671A discloses a magnetic detection device with a magnetic sensor surface-mounted on a substrate. This magnetic detection device includes first and second magnetism collecting rings that collect a magnetic flux to magnetism collecting parts, and the magnetic sensor is arranged between the magnetism collecting parts of the first and second magnetism collecting rings. The substrate is formed with a cutout, and the magnetic sensor overlaps the cutout. By inserting the magnetism collecting part of the second magnetism collecting ring into the cutout of the substrate, the detection sensitivity of the magnetic detection device is enhanced by reducing a magnetic gap between the magnetism collecting parts of the first and second magnetism collecting rings.

SUMMARY OF INVENTION

The insertion of the magnetism collecting part into the cutout is necessary to assemble the magnetic detection device disclosed in JP2016-102671A. Thus, the magnetism collecting part and the cutout have to be aligned with high accuracy and advanced technology is required for the assembling of the magnetic detection device.

The present invention aims to improve assemblability while enhancing the detection sensitivity of a magnetic detection device.

According to one aspect of the present invention, a magnetic detection device includes a substrate including a penetration part, a magnetic detection part supported on the substrate to overlap the penetration part, a pair of magnetic guiding parts arranged to sandwich the penetration part and the magnetic detection part, the pair of magnetic guiding parts being configured to guide a magnetic flux from a magnetic generation part to the magnetic detection part, and a soft magnetic member at least partially provided inside the penetration part.

DESCRIPTION OF EMBODIMENT

Hereinafter, a magnetic detection device 60, a torque sensor 30 and an electric power steering device 100 according to an embodiment of the present invention are described with reference to the accompanying drawings.

Figure 1:
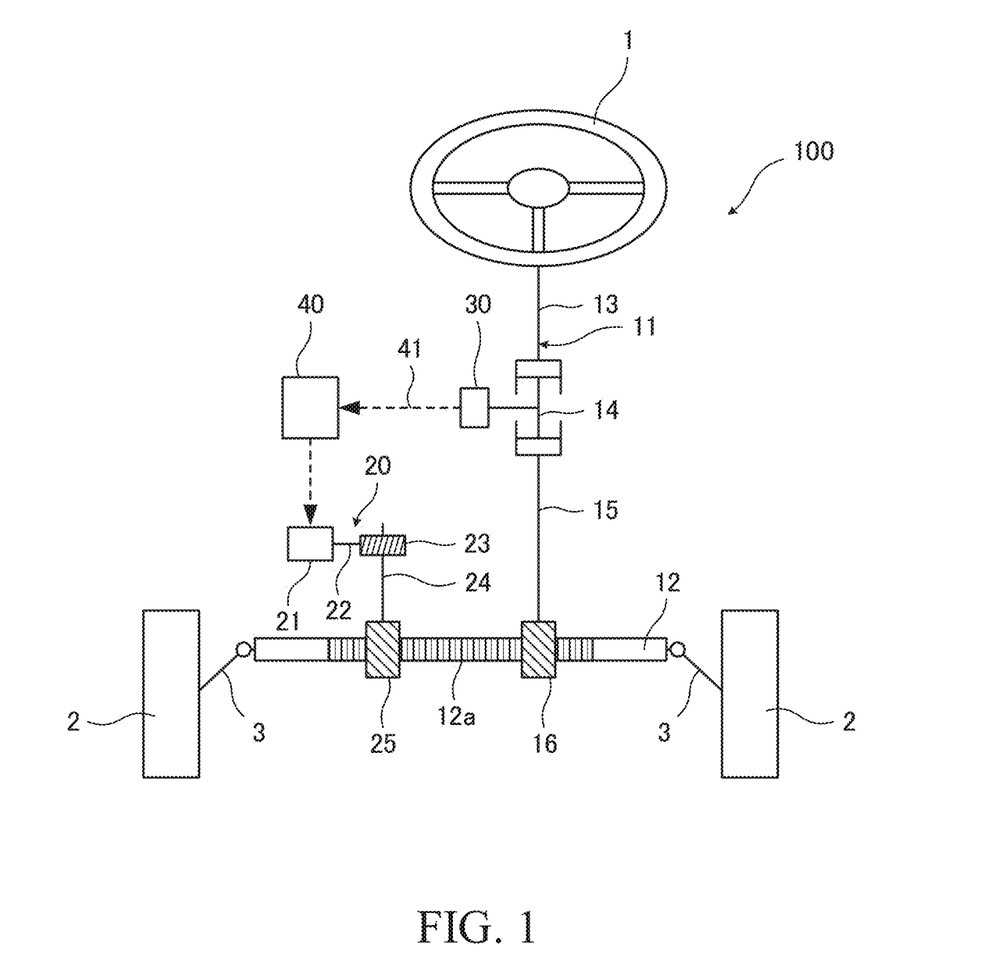
FIG. 1 is a configuration diagram of an electric power steering device according to an embodiment of the present invention.

First, the electric power steering device 100 is described with reference to FIG. 1. The electric power steering device 100 is mounted in a vehicle to assist the steering of a steering wheel 1 by a driver.

The electric power steering device 100 includes a steering shaft 11 that rotates according to the rotation of the steering wheel 1 and a rack shaft 12 that turns wheels 2 according to the rotation of the steering shaft 11. The rack shaft 12 is coupled to the wheels 2 via knuckle arms 3.

The steering shaft 11 includes an input shaft 13 serving as a first shaft coupled to the steering wheel 1 and an output shaft 15 serving as a second shaft coupled to the input shaft 13 via a torsion bar 14. The output shaft 15 is formed with a pinion gear 16 engaged with a rack gear 12a of the rack shaft 12, and the output shaft 15 and the rack shaft 12 are coupled by the engagement of the pinion gear 16 and the rack gear 12a. A steering torque that is generated by the steering of the steering wheel 1 is transmitted to the rack shaft 12 through the steering shaft 11.

Further, the electric power steering device 100 includes an assist mechanism 20 that assists the steering of the driver. The assist mechanism 20 includes an electric motor 21, a worm shaft 22 coupled to an output shaft of the electric motor 21, a worm wheel 23 engaged with the worm shaft 22, and a pinion shaft 24 coupled to the worm wheel 23. The pinion shaft 24 is formed with a pinion gear 25 engaged with the rack gear 12a of the rack shaft 12, and the pinion shaft 24 and the rack shaft 12 are coupled by the engagement of the pinion gear 25 and the rack gear 12a. An assist torque that is generated by the drive of the electric motor 21 is transmitted to the rack shaft 12 through the worm shaft 22, the worm wheel 23 and the pinion shaft 24.

As just described, in the electric power steering device 100, the steering torque of the steering wheel 1 and the assist torque of the electric motor 21 are respectively independently transmitted to the rack shaft 12. Such an electric power steering device 100 is also called a "dual pinion type electric power steering device".

The electric power steering device 100 further includes a torque sensor 30 that detects a steering torque input to the input shaft 13 and a controller 40 that controls the operation of the electric motor 21. The torque sensor 30 and the controller 40 are electrically connected via a signal line 41. The torque sensor 30 receives power from the controller 40 and outputs a signal corresponding to the detected steering torque to the controller 40. The controller 40 controls the operation of the electric motor 21 on the basis of the signal from the torque sensor 30, That is, the electric motor 21 generates the assist torque on the basis of the steering torque detected by the torque sensor 30.

Figure 2:
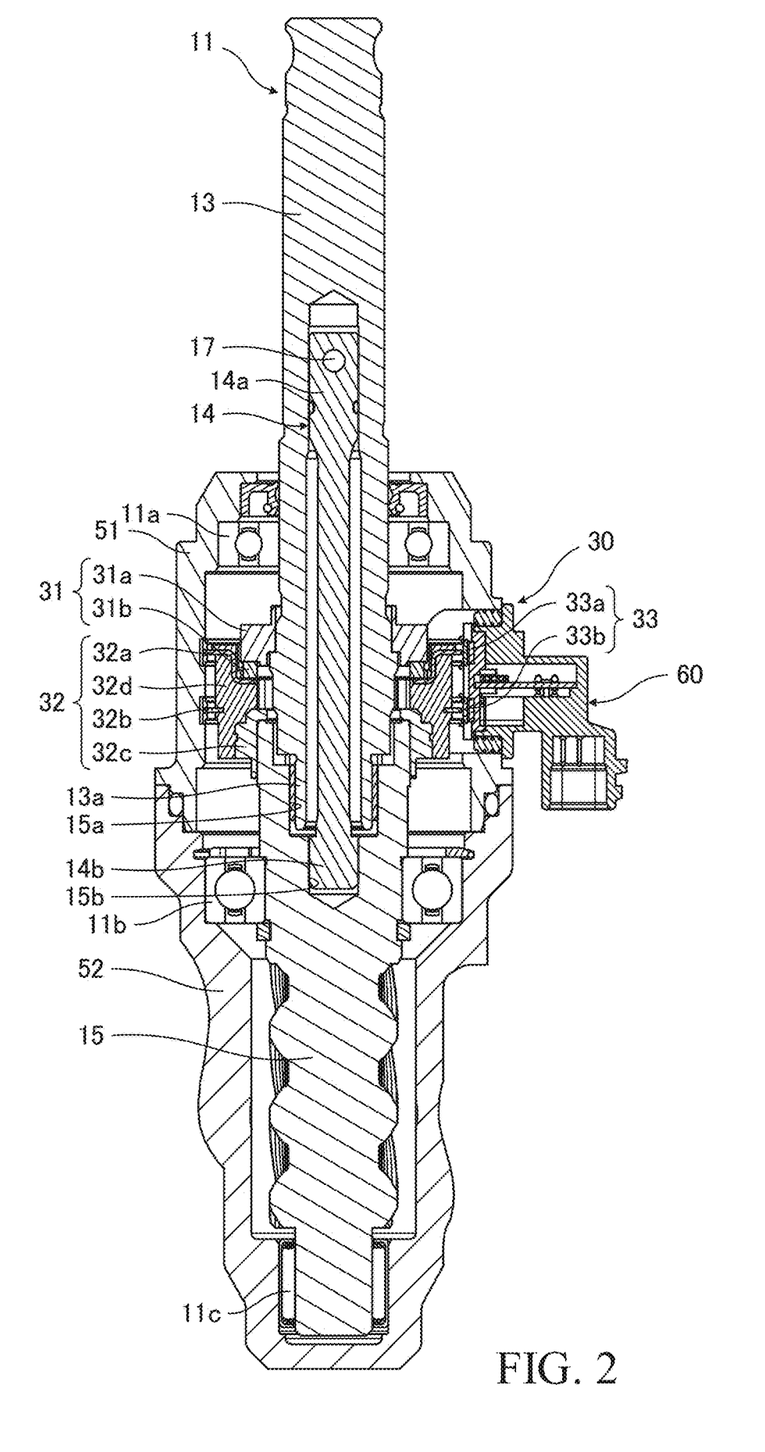
FIG. 2 is a partial sectional view of the electric power steering device according to the embodiment of the present invention.

As shown in FIG. 2, the input shaft 13 is rotatably supported in a first housing 51 via a bearing 11a, and the output shaft 15 is rotatably supported in a second housing 52 via bearings 11b and 11c. The output shaft 15 is formed with a hole 15a open in the upper end surface thereof, and a lower end part 13a of the input shaft 13 is inserted into the hole 15a.

A part of the input shaft 13 is formed to be hollow, and the torsion bar 14 is inserted into the input shall 13. An upper end part 14a of the torsion bar 14 is coupled to the input shall 13 via a pin 17. A lower end part 14b of the torsion bar 14 projects from a lower end part 13a of the input shaft 13 and is inserted into a hole 15b opened in the bottom, surface of the hole 15a of the output shaft 15. Serration is formed on the outer periphery of the lower end part 14b of the torsion bar 14, and the torsion bar 14 and the output shaft 15 are coupled via this serration.

The torsion bar 14 and the output shaft 15 are provided coaxially with a center axis of rotation of the input shaft 13. The torsion bar 14 transmits the steering torque input from the steering wheel 1 (see FIG. 1) to the input shaft 13 to the output shaft 15 and is torsionally deformed according to the steering torque.

In the following description, a direction along the center axis of rotation of the input shaft 13 is referred to as an "axial direction", a direction radially about the center axis of rotation of the input shaft 13 is referred to as a "radial direction" and a direction about the center axis of rotation of the input shaft 13 is referred to as a "circumferential direction".

The torque sensor 30 is mounted over the input shaft 13 and the output shaft 15. Specifically, the torque sensor 30 includes a magnetic generation part 31 supported on the input shaft 13, a rotating magnetic circuit part 32 supported on the output shaft 15 and a fixed magnetic circuit part 33 fixed to the first housing 51. The magnetic generation part 31 rotates together with the input shaft 13, and the rotating magnetic circuit part 32 rotates together with the output shaft 15.

The magnetic generation part 31 includes an annular back yoke 31a fit to the outer periphery of the input shaft 13 and a ring magnet 31b bonded to the lower end surface of the back yoke 31a. The ring magnet 31b is a permanent magnet for generating magnetism along the axial direction and includes twelve magnetic poles formed at an equal width in the circumferential direction. That is, six N poles and six S poles are alternately formed in the circumferential direction on each end surface of the ring magnet 31b. Such a ring magnet 31b is also called a "multi-pole magnet" and formed by applying magnetism to an annular hard magnetic body in an axial direction of the hard magnetic body.

The back yoke 31a is formed of a soft magnetic material and introduces a magnetic flux between adjacent magnetic poles of the ring magnet 31b. Thus, a magnetic force of the ring magnet 31b is concentrated on a side opposite to the hack yoke 31a.

Figure 3:
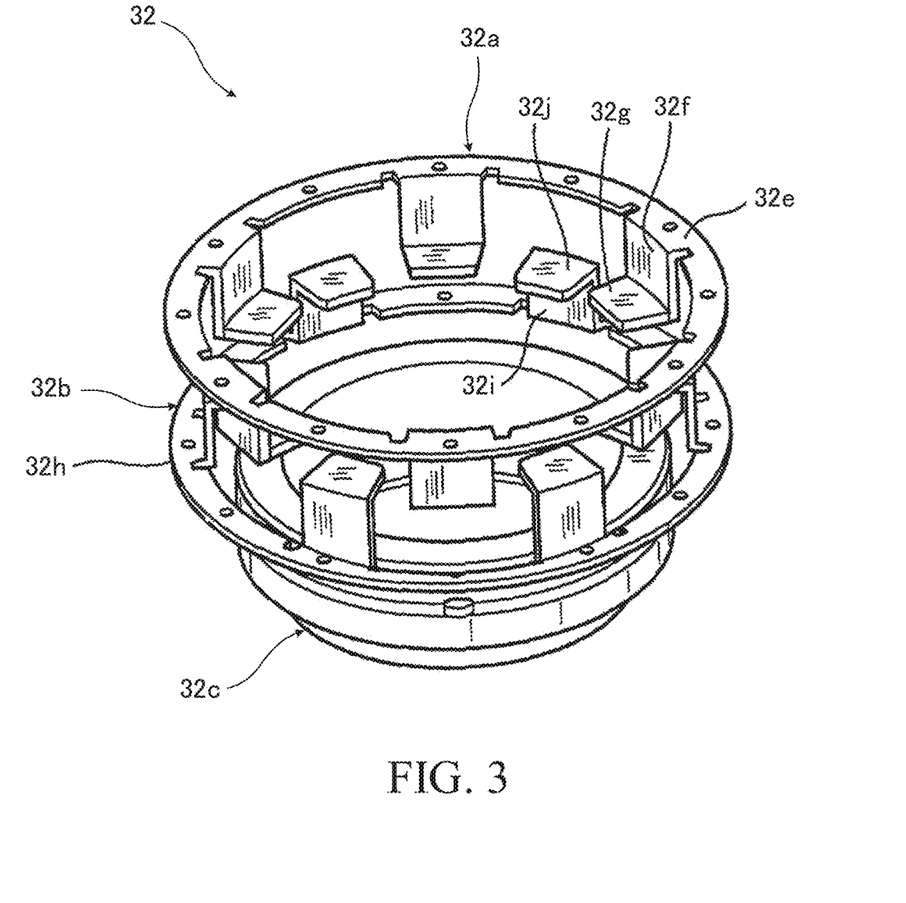
FIG. 3 is a perspective view of a rotating magnetic circuit part.

As shown in FIGS. 2 and 3, the rotating magnetic circuit part 32 includes first and second soft magnetic rings 32a, 32b and a supporting member 32c that supports the first and second soft magnetic rings 32a, 32b via a mold resin 32d. The supporting member 32c is mounted on the output shaft 15. It should be noted that the mold resin 32d is not shown in FIG. 3.

The first soft magnetic ring 32a includes a first magnetic path annular part 32e surrounding the back yoke 31a of the magnetic generation part 31, six first magnetic path column parts 32f projecting axially downward from the first magnetic path annular part 32e, and first magnetic path tip parts 32g bent radially inward from the lower ends of the first magnetic path column parts 32f. The first magnetic path tip parts 32g face the lower end surface of the ring magnet 31h. The second soft magnetic ring 32b includes a second magnetic path annular part 32h arranged at a distance in the axial direction from the first magnetic path annular part 32e, six second magnetic path column parts 32i projecting axially upward from the second magnetic path annular part 32h, and second magnetic path tip parts 32j bent radially inward from the upper ends of the second magnetic path column parts 32i. The second magnetic path tip parts 32j face the lower end surface of the ring magnet 31b.

The first magnetic path tip parts 32g and the second magnetic path tip parts 32j are alternately arranged at equal intervals in the circumferential direction on the same plane perpendicular to a center axis of rotation of the torsion bar 14. Further, the first magnetic path tip parts 32g and the second magnetic path tip parts 32j are arranged such that center lines thereof extending in radial directions indicate boundaries between the N poles and the S poles of the ring magnet 31b in a neutral state where no torque is acting on the torsion bar 14. Thus, the N poles and the S poles of the ring magnet 31b are magnetically shorted by the first magnetic path tip parts 32g and the second magnetic path tip parts 32j and the magnetic flux of the ring magnet 31b is not introduced to the first magnetic path annular part 32e and the second magnetic path annular part 32h of the rotating magnetic circuit part 32.

When a torque acts on the torsion bar 14 in a predetermined direction and the input shaft 13 and the output shaft 15 relatively rotate, the first magnetic path tip parts 32g face the S poles and the N poles \kith larger areas facing the N poles than the S poles and the second magnetic path tip parts 32j face the S poles and the N poles with larger areas facing the S poles than the N poles. As a result, a magnetic short circuit by the first magnetic path tip parts 32g and the second magnetic path tip parts 32j is released, and the magnetic flux of the ring magnet 31b is introduced to the first magnetic path annular part 32e and the second magnetic path annular part 32h of the rotating magnetic circuit part 32.

When a torque acts on the torsion bar 14 in an opposite direction and the input shaft 13 and the output shaft 15 relatively rotate, the first magnetic path tip parts 32g face the S poles and the N poles with larger areas facing the S poles than the N poles and the second magnetic path tip parts 32j face the S poles and the N poles with larger areas facing the N poles than the S poles. As a result, the magnetic flux of the ring magnet 31b is introduced in an opposite direction to the first magnetic path annular part 32e and the second magnetic path annular part 32h of the rotating magnetic circuit part 32.

The larger the torque acting on the torsion bar 14, the larger a torsional deformation amount of the torsion bar 14. Thus, a difference between the areas of the first magnetic path tip parts 32g facing the N poles and the S poles of the ring magnet 31b and a difference between the areas of the second magnetic path tip parts 32j facing the N poles and the S poles of the ring magnet 31b become larger, and the magnetic flux introduced from the ring magnet 31b to the first magnetic path annular part 32e and the second magnetic path annular part 32h of the rotating magnetic circuit part 32 increases.

As just described, the first magnetic path tip parts 32g and the second magnetic path tip parts 32j of the rotating magnetic circuit part 32 change the direction and magnitude of the magnetic flux introduced from the ring magnet 32b to the first magnetic path annular part 32e and the second magnetic path annular part 32h according to the direction and magnitude of the torque acting on the torsion bar 14.

It should be noted that the magnetic generation part 31 may be fixed to the output shaft 15 to rotate together with the output shaft 15 and the rotating magnetic circuit part 32 may be fixed to the input shaft 13 to rotate together with the input shaft 13 instead of fixing the magnetic generation part 31 to the input shaft 13 and fixing the rotating magnetic circuit part 32 to the output shaft 15.

As shown in FIG. 2, the fixed magnetic circuit part 33 includes a first magnetism collecting ring 33a and a second magnetism collecting ring 33b fixed to the inner peripheral surface of the first housing 51 by crimping. The first magnetism collecting ring 33a is provided along the outer periphery of the first magnetic path annular part 32e (see FIG. 3) of the rotating magnetic circuit part 32. Thus, the magnetic flux from the ring magnet 31b of the magnetic generation part 31 is introduced to the first magnetism collecting ring 33a through the first soft magnetic ring 32a of the rotating magnetic circuit part 32. Similarly, the second magnetism collecting ring 33b is provided along the outer periphery of the second magnetic path annular part 32h (see FIG. 3) of the rotating magnetic circuit part 32. Thus, the magnetic flux from the ring magnet 31b of the magnetic generation part 31 is introduced to the second magnetism collecting ring 33b through the second soft magnetic ring 32b of the rotating magnetic circuit part 32.

Further, the torque sensor 30 includes the magnetic detection device 60 that detects a magnetic flux introduced from the magnetic generation part 31 to the fixed magnetic circuit part 33 through the rotating magnetic circuit part 32. The magnetic detection device 60 is described in detail below with reference to FIGS. 4 to 7.

Figure 4:
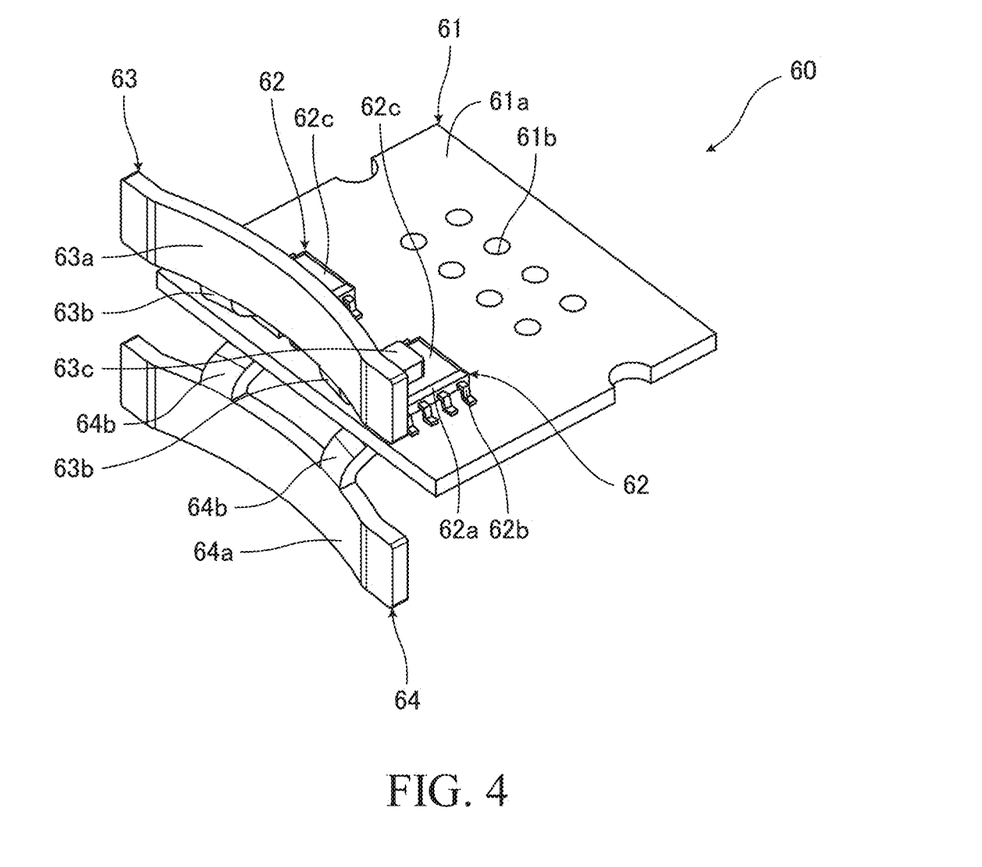
FIG. 4 is a perspective view of a magnetic detection device according to the embodiment of the present invention.
Figure 5:
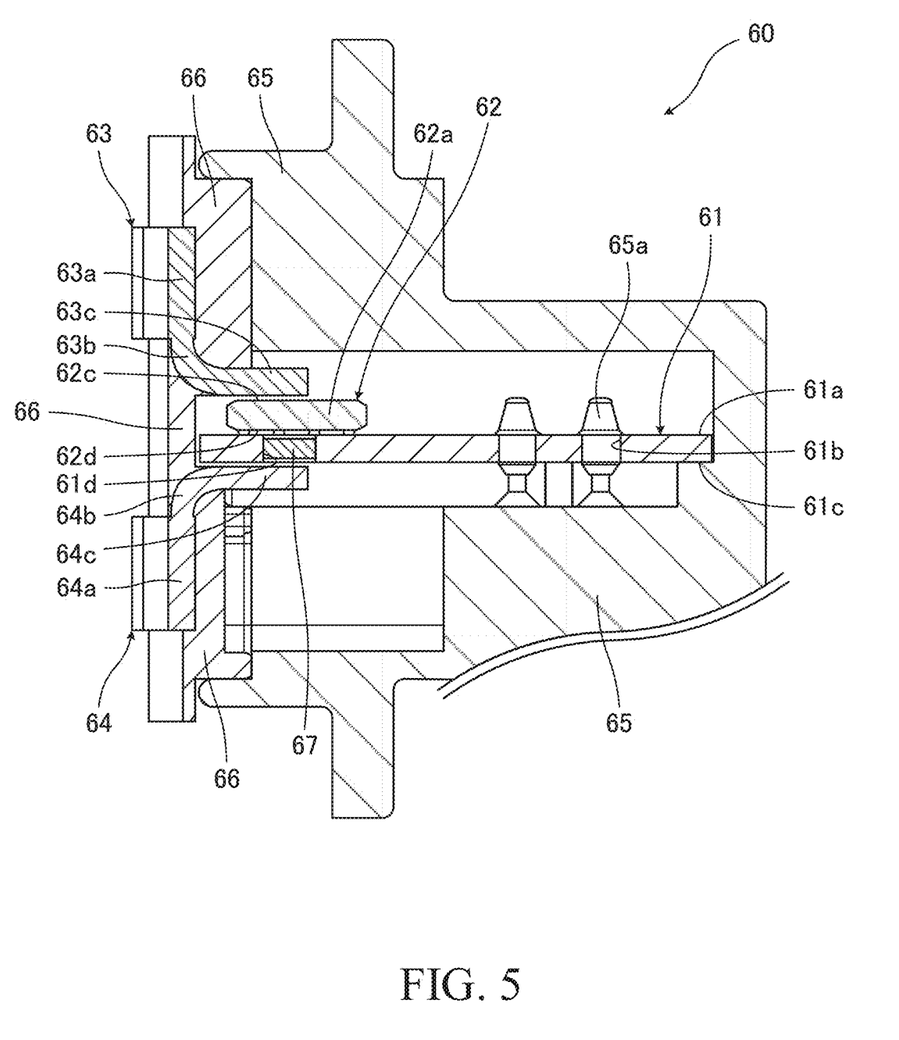
FIG. 5 is a sectional view of the magnetic detection device according to the embodiment of the present invention.

As shown in FIGS. 4 and 5, the magnetic detection device 60 includes a substrate 61, two magnetic sensors 62 mounted on the substrate 61 and a first magnetism collecting yoke 63 and a second magnetism collecting yoke 64 that introduce a magnetic flux from the fixed magnetic circuit part 33 to the magnetic sensors 62. The substrate 61 is housed into a case 65 mounted on the first housing 51 (see FIG. 2). The first magnetism collecting yoke 63 and the second magnetism collecting yoke 64 are held by a holder 66 fixed to the case 65. The holder 66 is detachably provided along the substrate 61 of the case 65. It should be noted that the case 65 and the holder 66 are not shown in FIG. 4.

The substrate 61 is formed with a plurality of holes 61b through which connection pins 65a supported in the case 65 are inserted. A wiring (not shown) is formed on a front surface 61a of the substrate 61 by patterning. This wiring is electrically connected to the signal line 41 (see FIG. 1) via the connection pins 65a.

The magnetic sensor 62 includes a sensor body 62a serving as a magnetic detection part that detects a magnetic flux density and a plurality of terminals 62b that electrically connects the sensor body 62a and the wiring of the substrate 61. The sensor body 62a includes a Hall element (not shown) that outputs a voltage corresponding to the magnetic flux density, and outputs a voltage corresponding to the magnitude and direction of the magnetic flux density to the controller 40 (see FIG. 1) through the substrate 61.

The sensor body 62a is in the form of a plate and provided on the substrate 61 substantially in parallel to the substrate 61 so that a back surface 62d of the sensor body 62a faces the front surface 61a of the substrate 61. The plurality of terminals 62b extend from both side surfaces of the sensor body 62a toward the substrate 61 and fixed on the wiring of the substrate 61 by solder. In this way, the sensor body 62a is supported on the substrate 61 via the plurality of terminals 62b.

The magnetic detection device 60 is provided with two magnetic sensors 62 to diagnose a malfunction of the magnetic detection device 60 by comparing voltage signals of the both. In other words, one magnetic sensor 62 may be provided unless a malfunction of the magnetic detection device 60 is diagnosed using the magnetic sensors 62.

The first magnetism collecting yoke 63 includes a yoke body 63a formed into a substantially arcuate shape, a pair of leg parts 63b projecting from the yoke body 63a and claw parts (magnetic guiding parts) 63c provided on the tips of the leg parts 63b. Similarly, the second magnetism collecting yoke 64 includes a yoke body 64a formed into a substantially arcuate shape, a pair of leg parts 64b projecting from the yoke body 64a and claw parts (magnetic guiding parts) 64c provided on the tips of the leg parts 64b. With the magnetic detection device 60 mounted on the first housing 51, the inner peripheral surfaces of the yoke bodies 63a, 64a are respectively in contact with the outer peripheral surfaces of the first and second magnetism collecting rings 33a, 33b of the fixed magnetic circuit part 33 (see FIG. 2).

The yoke body 63a and the yoke body 64a are arranged at a distance in the axial direction. The leg parts 63b and the leg parts 64b are bent radially outward from end surfaces of the yoke bodies 63a, 64a facing each other to narrow an interval therebetween toward a tip side. The claw parts 63c and the claw parts 64c are in the form of flat plates, and arranged in parallel at a distance from each other to sandwich the sensor bodies 62a of the magnetic sensors 62 and the substrate 61. The claw parts 63c face a front surface 62c of the sensor body 62a at a distance therefrom, and the claw parts 64c face a back surface 61c of the substrate 61 at a distance therefrom.

An interval between the claw parts 63c and the claw parts 64c is narrower than that between the yoke body 63a and the yoke body 64a, and the claw parts 63c and the claw parts 64c guide a magnetic flux introduced from the first and second magnetism collecting rings 33a, 33b (see FIG. 2) of the fixed magnetic circuit part 33 to the yoke bodies 63a, 64a to the sensor bodies 62a. In this way, the magnetic detection device 60 detects the magnetic flux introduced from the ring magnet 31b of the magnetic generation part 31 to the fixed magnetic circuit part 33 through the rotating magnetic circuit part 32.

Figure 6:
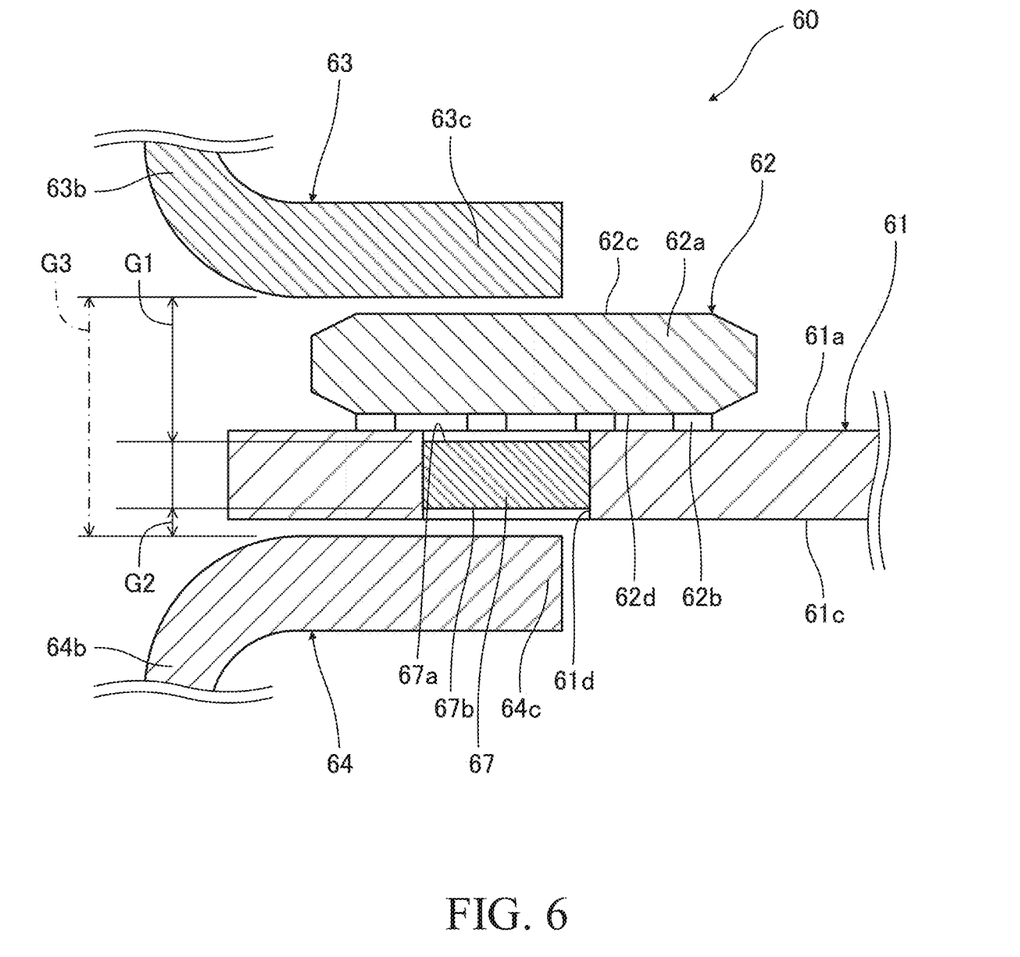
FIG. 6 is an enlarged sectional view showing the periphery of a magnetic sensor shown in FIG. 5.
Figure 7:
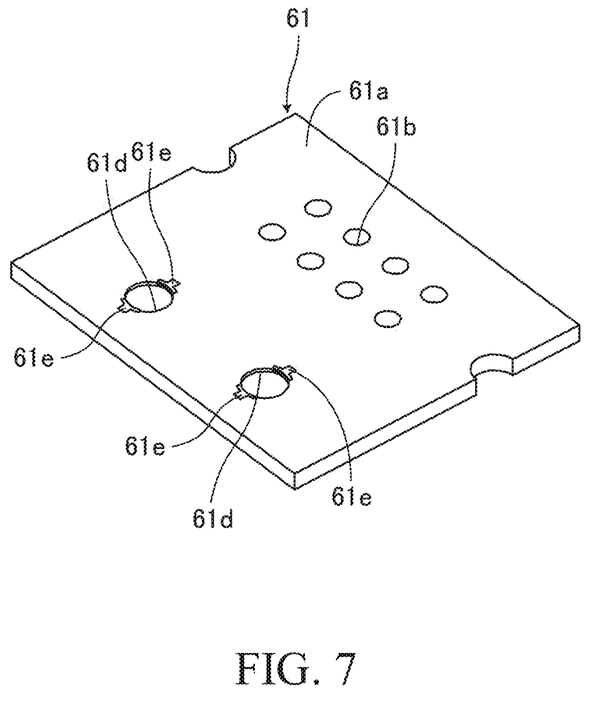
FIG. 7 is a perspective view of a substrate shown in FIG. 5.

As shown in FIGS. 6 and 7, the substrate 61 includes two through holes 61d serving as penetration parts penetrating between the front surface 61a and the back surface 61c. The magnetic sensors 62 are arranged on the substrate 61 to overlap the through holes 61d, and the claw parts 63c and the claw parts 64c are arranged to sandwich the sensor bodies 62a and the through holes 61d.

Soft magnetic members 67 are provided inside the through holes 61d. The soft magnetic members 67 are formed substantially into the same shape as the through holes 61d to close the through holes 61d. The soft magnetic members 67 are formed of a material having a small holding force and a large magnetic permeability such as iron, silicon steel, Permalloy or amorphous magnetic alloy.

The claw parts 64c of the second magnetism collecting yoke 64 face the soft magnetic members 67 at a distance therefrom. Thus, a first magnetic gap G1 between the claw parts 63c and the soft magnetic members 67 and a second magnetic gap G2 between the claw parts 64c and the soft magnetic members 67 are formed between the claw parts 63c and the claw parts 64c.

If the soft magnetic members 67 are not provided inside the through holes 61d, a magnetic gap G3 is formed between the claw parts 63c and the claw parts 64c. Thus, a leakage magnetic flux corresponding to the size of the magnetic gap G3 is generated between the claw parts 63c and the claw parts 64c.

In the magnetic detection device 60, the first magnetic gap G1 and the second magnetic gap G2 are formed between the claw parts 63c and the claw parts 64c as described above. The sum of the first magnetic gap G1 and the second magnetic gap G2 is smaller than the magnetic gap G3 by a thickness of the soft magnetic members 67. The smaller the magnetic gaps, the smaller the leakage magnetic flux. Thus, the leakage magnetic flux in the magnetic detection device 60 is smaller as compared to the case where the soft magnetic members 67 are not provided inside the through holes 61d. Since more magnetic flux passes through the sensor bodies 62a of the magnetic detection device 60, the detection sensitivity of the magnetic detection device 60 can be enhanced. Therefore, the influence of external causes such as noise can be mitigated and the detection accuracy of the magnetic detection device 60 can be enhanced.

As another method for reducing the leakage magnetic flux between the claw parts 63c and the claw parts 64c, it is also considered to reduce the interval between the claw parts 63c and the claw parts 64c by inserting the claw parts 64c into the through holes 61d of the substrate 61. However, the positions of the claw parts 64c and the through holes 61d need to be aligned with high accuracy to insert the claw parts 64c into the through holes 61d, and advanced technology is required to assemble such a magnetic detection device.

Since the soft magnetic members 67 are provided inside the through holes 61d of the substrate 61 in the magnetic detection device 60, the magnetic gap between the claw parts 63c and the claw parts 64c is narrowed by the soft magnetic members 67. Thus, the leakage magnetic flux between the claw parts 63c and the claw parts 64c can be reduced without inserting the claw parts 64c into the through holes 61d of the substrate 61. In this way, assemblability can be improved while the detection sensitivity of the magnetic detection device 60 is enhanced.

The soft magnetic member 67 has a first facing surface 67a that faces the back surface 62d of the sensor body 62a of the magnetic sensor 62 at a distance therefrom. The first facing surface 67a is located inside the through hole 61d of the substrate 61. Thus, the soft magnetic member 67 is provided inside the through hole 61d without projecting toward the sensor body 62a from the front surface 61a of the substrate 61. Therefore, the magnetic sensor 62 can be mounted on the substrate 61 without bringing the sensor body 62a and the soft magnetic member 67 into contact by controlling an interval between the back surface 62d of the sensor body 62a and the front surface 61a of the substrate 61. In this way, the assemblability of the magnetic detection device 60 can be improved.

Further, the soft magnetic member 67 has a second facing surface 67b that faces the claw part 64c at a distance therefrom. The second facing surface 67b is located inside the through hole 61d of the substrate 61. Thus, the soft magnetic member 67 is provided inside the through hole 61d without projecting toward the claw part 64c from the back surface 61c of the substrate 61. Therefore, the substrate 61 and the magnetic sensor 62 can be arranged between the claw part 63c and the claw part 64c without bringing the claw part 64c and the soft magnetic member 67 into contact by controlling an interval between the claw part 64c and the substrate 61. In this way, the assemblability of the magnetic detection device 60 can be improved.

It should be noted that "the first facing surface 67a is located inside the through hole 61d of the substrate 61" also includes a case where the first facing surface 67a forms a flat surface continuous without any step together with the front surface 61a of the substrate 61. Similarly, "the second facing surface 67b is located inside the through hole 61d of the substrate 61" also includes a case where the second facing surface 67b forms a flat surface continuous without any step together with the back surface 61c of the substrate 61.

Solderable copper foil patterns 61e are formed on an opening edge of the through hole 61d. The soft magnetic member 67 is fixed to the substrate 61 by solder (not shown) attached to the copper foil patterns 61e. Thus, the soft magnetic member 67 can be fixed to the substrate 61 in the process of fixing the magnetic sensor 62 to the substrate 61 by soldering, and assembly man-hours of the magnetic detection device 60 can be reduced.

Further, since both the magnetic sensor 62 and the soft magnetic member 67 are fixed to the substrate 61, relative movements of the magnetic sensor 62 and the soft magnetic member 67 can be prevented. Therefore, a reduction of detection accuracy due to an interval variation between the magnetic sensor 62 and the soft magnetic member 67 can be prevented.

Moisture-proof coating is applied to the substrate 61. The moisture-proof coating is performed with the magnetic sensors 62 and the soft magnetic members 67 fixed to the substrate 61. This is, the magnetic sensors 62 and the soft magnetic members 67 are covered with the moisture-proof coating. Therefore, the detachment of the soft magnetic members 67 from the substrate 61 can be prevented while the magnetic sensors 62 and the soft magnetic members 67 are protected from moisture.

In the magnetic detection device 60, the through holes 61d penetrate through the substrate 61. Thus, the deformation of the substrate 61 can be mitigated as compared to the case where cutouts penetrate through the substrate 61. Therefore, displacements of the sensor bodies 62a associated with the deformation of the substrate 61 can be mitigated and the detection accuracy of the magnetic detection device 60 can be enhanced.

Next, the detection of the steering torque by the torque sensor 30 and the assist of the steering by the electric power steering device 100 are described with reference to FIGS. 1 to 5.

In a state where the steering wheel 1 is not operated, no steering torque is acting on the torsion bar 14. In this neutral state, the same areas of the first magnetic path tip parts 32g of the first soft magnetic ring 32a and the second magnetic path tip parts 32j of the second soft magnetic ring 32b of the rotating magnetic circuit part 32 face the N poles and the S poles of the ring magnet 31b. Thus, a magnetic flux from the ring magnet 31b is not introduced to the first magnetic path annular part 32e of the first soft magnetic ring 32a and the second magnetic path annular part 32h of the second soft magnetic ring 32b and the magnetic flux from the ring magnet 31b is not introduced to the magnetic detection device 60.

When the driver steers the steering wheel 1, a steering torque acts on the torsion bar 14. According to the magnitude and direction of the steering torque, the magnetic flux from the ring magnet 31b is introduced to the sensor bodies 62a of the magnetic sensors 62 through the rotating magnetic circuit part 32, the fixed magnetic circuit part 33 and the first magnetism collecting yoke 63 and the second magnetism collecting yoke 64 of the magnetic detection device 60. The sensor bodies 62a output voltages corresponding to the magnitude and direction of the magnetic flux density.

As just described, the sensor bodies 62a of the magnetic detection device 60 output voltages corresponding to the magnitude and direction of the steering torque acting on the torsion bar 14. That is, the torque sensor 30 detects the magnitude and direction of the steering torque input to the steering wheel 1 on the basis of the voltages output by the sensor bodies 62a of the magnetic detection device 60. Since the detection sensitivity of the magnetic detection device 60 can be enhanced as described above, the detection accuracy of the torque sensor 30 can be enhanced.

A voltage from the torque sensor 30 is transmitted to the controller 40 through the signal line 41. The controller 40 drives the electric motor 21 according to the voltage from the torque sensor 30. In this way, the rack shaft 12 moves to turn the wheels 2. As just described, the electric power steering device 100 assists the steering according to the steering torque input to the steering wheel 1. Since the detection accuracy of the torque sensor 30 can be enhanced, the wheels 2 can be turned with higher accuracy according to the torque input to the steering wheel 1 by the driver.

Next, a manufacturing method of the magnetic detection device 60 is described.

First, solder paste is printed on the front surface 61a of the substrate 61. Thereafter, the soft magnetic members 67 are arranged inside the through holes 61d, the magnetic sensors 62 are arranged on the front surface 61a of the substrate 61 and the solder paste is heated to be melted. By cooling and solidifying the solder paste, the soft magnetic members 67 and the magnetic sensors 62 are fixed to the substrate 61.

Subsequently, the substrate 61 is inserted into the case 65. At this time, the connection pins 65a are inserted into the holes 61b of the substrate 61. Thereafter, the wiring of the substrate 61 and the connection pins 65a are electrically connected by soldering.

Subsequently, the holder 66 having the first magnetism collecting yoke 63 and the second magnetism collecting yoke 64 mounted therein in advance is mounted into the case 65. At this time, by inserting the holder 66 along the substrate 61 into the case 65, the sensor bodies 62a of the magnetic sensors 62 and the soft magnetic members 67 are inserted between the claw parts 63c of the first magnetism collecting yoke 63 and the claw parts 64c of the second magnetism collecting yoke 64.

The magnetic detection device 60 is assembled and manufactured in the above way.

The configuration, functions and effects of the embodiment of the present invention are summarized below.

The magnetic detection device 60 includes the substrate 61 having the through holes 61d, the sensor bodies 62a supported on the substrate 61 to overlap the through holes 61d, the pairs of claw parts 63c, 64c arranged to sandwich the through holes 61d and the sensor bodies 62a and configured to guide a magnetic flux from the magnetic generation part 31 to the sensor bodies 62a, and the soft magnetic members 67 at least partially provided inside the through holes 61d.

In this configuration, the soft magnetic members 67 are at least partially provided inside the through holes 61d of the substrate 61. Thus, the magnetic gap between the pairs of claw parts 63c, 64c is narrowed by the soft magnetic members 67. Therefore, a leakage magnetic flux between the pairs of claw parts 63c, 64c can be mitigated without inserting the claw parts 63c, 64c into the through holes 61d of the substrate 61. In this way, assemblability can be improved while the detection sensitivity of the magnetic detection device 60 is enhanced.

Further, in the magnetic detection device 60, the soft magnetic member 67 has the first facing surface 67a facing the sensor body 62a and the first facing surface 67a is located inside the through hole 61d.

In this configuration, the first facing surface 67a of the soft magnetic member 67 is located inside the through hole 61d. Thus, the soft magnetic member 67 is provided in the through hole 61d without projecting toward the sensor body 62a. Therefore, the sensor body 62a can be mounted on the substrate 61 without bringing the sensor body 62a and the soft magnetic member 67 into contact by controlling the interval between the sensor body 62a and the substrate 61.

Further, in the magnetic detection device 60, the soft magnetic member 67 has the second facing surface 67b facing one claw part 64c and the second facing surface 67b is located inside the through hole 61d.

In this configuration, the second facing surface 67b of the soft magnetic member 67 is located inside the through hole 61d. Thus, the soft magnetic member 67 is provided in the through hole 61d without projecting toward the one claw part 64c, Therefore, the substrate 61 and the sensor body 62a can be arranged between the pair of claw parts 63c, 64c without bringing the claw part 64c and the soft magnetic member 67 into contact by controlling the interval between the one claw part 64c and the substrate 61.

Further, in the magnetic detection device 60, the soft magnetic member 67 is fixed to the substrate 61 by solder.

In this configuration, the soft magnetic member 67 is fixed to the substrate 61 by solder. Thus, the soft magnetic member 67 can be fixed to the substrate 61 in the process of fixing the sensor body 62a to the substrate 61 by soldering and assembly man-hours of the magnetic detection device 60 can be reduced.

Further, in the magnetic detection device 60, the moisture-proof coating is applied to the substrate 61 and the sensor bodies 62a and the soft magnetic members 67 are covered with the moisture-proof coating.

In this configuration, the sensor bodies 62a and the soft magnetic members 67 are covered with the moisture-proof coating. Therefore, the detachment of the soft magnetic members 67 from the substrate 61 can be prevented while the sensor bodies 62a and the soft magnetic, embers 67 are protected from moisture.

Further, in the magnetic detection device 60, the through holes 61d penetrate through the substrate 61.

In this configuration, the through holes 61d penetrate through the substrate 61. Thus, the deformation of the substrate 61 can be mitigated as compared to the case where cutouts penetrate through the substrate 61. Therefore, displacements of the sensor bodies 62a associated with the deformation of the substrate 61 can be mitigated and the detection accuracy of the magnetic detection device 60 can be enhanced.

Further, the torque sensor 30 includes the magnetic detection device 60, the magnetic generation part 31, the input shaft 13 configured to rotate together with the magnetic generation part 31, the torsion bar 14 coupled to the input shaft 13 and configured to be torsionally deformed according to a torque input to the input shaft 13, the output shaft 15 coupled to the torsion bar 14 and configured to relatively rotate with respect to the input shaft 13 according to the torsional deformation of the torsion bar 14, and the rotating magnetic circuit part 32 supported on the output shaft 15 and configured to change the magnitude and direction of a magnetic flux introduced from the magnetic generation part 31 to the pairs of claw parts 63c, 64c according to the relative rotation of the input shaft 13 and the output shaft 15.

In this configuration, the rotating magnetic circuit part 32 changes the magnitude and direction of the magnetic flux introduced from the magnetic generation part 31 to the pairs of claw parts 63c, 64c according to the relative rotation of the input shaft 13 and the output shaft 15. Thus, the magnetic detection device 60 detects a magnetic flux density changing according to a torque applied to the torsion bar 14. Since the detection sensitivity of the magnetic detection device 60 can be enhanced, influences due to noise and the like can be mitigated and the detection accuracy of the torque sensor 30 can be enhanced.

Further, the electric power steering device 100 includes the torque sensor 30 and the electric motor 21 configured to operate on the basis of a torque detected by the torque sensor 30 to turn the wheels 2.

In this configuration, the electric motor 21 operates on the basis of the torque detected by the torque sensor 30 to turn the wheels 2. Thus, the wheels 2 are turned on the basis of the torque detected by the torque sensor 30. Since the detection accuracy of the torque sensor 30 can be enhanced, the wheels 2 can be turned with higher accuracy according to the input torque.

Although the embodiment of the present invention has been described above, the above embodiment is merely an illustration of one exemplary application of the present invention and is not intended to limit the technical scope of the present invention to the specific configuration of the above embodiment.

(1) The magnetic detection device 60 may be used in an angle sensor for detecting an absolute rotation angle of the steering shaft H. The torque sensor 30 may be a torque angle sensor or a position sensor for detecting an absolute rotation angle of the steering shaft 11.

(2) In the above embodiment, the through hole 61d penetrates through the substrate 61 and the soft magnetic member 67 is provided inside the through hole 61d. However, the substrate 61 may include a cutout penetrating between the front surface 61a and the back surface 61c and open in the outer peripheral surface of the substrate 61 and the soft magnetic member 67 may be provided inside the cutout. That is, a penetration part formed in the substrate 61 may be a cutout.

(3) In the above embodiment, the soft magnetic member 67 is entirely provided inside the through hole 61d. However, the soft magnetic member 67 may partially project from the through hole 61d. Specifically, the first facing surface 67a of the soft magnetic member 67 may be located outside the through hole 61d and the soft magnetic member 67 may project toward the sensor body 62a. Further, the second facing surface 67b of the soft magnetic member 67 may be located outside the through hole 61d and the soft magnetic member 67 may project toward the claw part 64c. That is, the soft magnetic member 67 has only to be at least partially provided inside the through hole 61d.

(4) In the above embodiment, the soft magnetic member 67 faces the sensor body 62a at a distance therefrom. However, the soft magnetic member 67 may be in contact with the sensor body 62a. In this case, the first magnetic gap G1 between the claw part 63c and the soft magnetic member 67 can be narrowed. A leakage magnetic flux in the first magnetic gap G1 can be reduced and the detection sensitivity of the magnetic detection device 60 can be enhanced. Therefore, the influence of external causes such as noise can be mitigated and the detection accuracy of the magnetic detection device 60 can be enhanced.

(5) In the above embodiment, the soft magnetic member 67 faces the claw part 64c at a distance therefrom. However, the soft magnetic member 67 may be in contact with the claw part 64c. In this case, no magnetic gap is formed between the claw part 64c and the soft magnetic member 67. Thus, a leakage magnetic flux between the pair of claw parts 63c and 64c can be reduced and the detection sensitivity of the magnetic detection device 60 can be enhanced. Therefore, the influence of external causes such as noise can be mitigated and the detection accuracy of the magnetic detection device 60 can be enhanced.

(6) In the above embodiment, the soft magnetic member 67 has substantially the same shape as the through hole 61d and closes the through holes 61d. However, the soft magnetic member 67 may not close the through hole 61d and a clearance may be formed between the inner peripheral surface of the through hole 61d and the outer peripheral surface of the soft magnetic member 67.

(7) In the above embodiment, the dual pinion type electric power steering device 100 has been described in which a steering torque by the driver and a steering assist torque by the electric motor 21 are respectively independently input to the rack shaft 12. However, the present invention may be applied to a single pinion type electric power steering device in which a steering torque by the driver and a steering assist torque by the electric motor 21 are input to the rack shaft 12 via a common steering shaft. In such a case, the assist mechanism 20 is provided on the output shaft 15.

(8) In the above embodiment, the electric power steering device 100 has been described in which the electric motor 21 is coupled to the pinion shaft 24 engaged with the rack shaft 12 via the worm shaft 22 and the worm wheel 23 and the torque sensor 30 and the assist mechanism 20 are arranged near the rack shaft 12. However, the present invention may be applied to a column type electric power steering device in which the output shaft 15 is coupled to a pinion shaft engaged with the rack shaft 12 via an intermediate shaft. Further, the present invention may be applied to a steer-by-wire type electric power steering device in which the steering wheel 1 and the rack shaft 12 are not mechanically coupled in normal time and are mechanically coupled in the event of a failure.

The present application claims a priority based on Japanese Patent Application No. 2017-078122 filed with the Japan Patent Office on Apr. 11, 2017, and all the contents of this application are incorporated herein by reference.

The invention claimed is:
1. A magnetic detection device, comprising:
a substrate including a penetration part;
a magnetic detection part supported on the substrate to overlap the penetration part;
a pair of magnetic guiding parts arranged to sandwich the penetration part and the magnetic detection part, the pair of magnetic guiding parts being configured to guide a magnetic flux from a magnetic generation part to the magnetic detection part; and
a soft magnetic member at least partially provided inside the penetration part, wherein:
the soft magnetic member has a first facing surface facing the magnetic detection part; and
the first facing surface is located inside the penetration part.

2. The magnetic detection device according to claim 1, wherein:
the soft magnetic member is fixed to the substrate by solder.

3. The magnetic detection device according to claim 1, wherein:
moisture-proof coating is applied to the substrate; and
the magnetic detection part and the soft magnetic member are covered with the moisture-proof coating.

4. The magnetic detection device according to claim 1, wherein:
the penetration part is a through hole.

5. A torque sensor, comprising:
the magnetic detection device according to claim 1;
the magnetic generation part;
a first shaft configured to rotate together with the magnetic generation part;
a torsion bar coupled to the first shaft, the torsion bar being torsionally deformed according to a torque input to the first shaft;
a second shaft coupled to the torsion bar, the second shaft relatively rotating with respect to the first shaft according to a torsional deformation of the torsion bar; and
a rotating magnetic circuit part supported on the second shaft, the rotating magnetic circuit part being configured to change a magnitude and a direction of a magnetic flux introduced from the magnetic generation part to the pair of magnetic guiding parts according to relative rotation of the first shaft and second shaft.

6. An electric power steering device, comprising:
the torque sensor according to claim 5; and
an electric motor configured to operate on the basis of a torque detected by the torque sensor to turn wheels.

7. A magnetic detection device, comprising:
a substrate including a penetration part;
a magnetic detection part supported on the substrate to overlap the penetration part;
a pair of magnetic guiding parts arranged to sandwich the penetration part and the magnetic detection part, the pair of magnetic guiding parts being configured to guide a magnetic flux from a magnetic generation part to the magnetic detection part; and
a soft magnetic member at least partially provided inside the penetration part, wherein:
the soft magnetic member has a second facing surface facing one of the pair of magnetic guiding parts; and
the second facing surface is located inside the penetration part.

8. The magnetic detection device according to claim 7, wherein:
the soft magnetic member is fixed to the substrate by solder.

9. The magnetic detection device according to claim 7, wherein:
moisture-proof coating is applied to the substrate; and
the magnetic detection part and the soft magnetic member are covered with the moisture-proof coating.

10. The magnetic detection device according to claim 7, wherein:
the penetration part is a through hole.

11. A torque sensor, comprising:
the magnetic detection device according to claim 7;
the magnetic generation part;
a first shaft configured to rotate together with the magnetic generation part;
a torsion bar coupled to the first shaft, the torsion bar being torsionally deformed according to a torque input to the first shaft;
a second shaft coupled to the torsion bar, the second shaft relatively rotating with respect to the first shaft according to a torsional deformation of the torsion bar; and
a rotating magnetic circuit part supported on the second shaft, the rotating magnetic circuit part being configured to change a magnitude and a direction of a magnetic flux introduced from the magnetic generation part to the pair of magnetic guiding parts according to relative rotation of the first shaft and second shaft.

12. An electric power steering device, comprising:
the torque sensor according to claim 11; and
an electric motor configured to operate on the basis of a torque detected by the torque sensor to turn wheels.

* * * * *